3,526,744
STUD FEEDING SYSTEM FOR WELDING TOOLS
Don E. Ehrlich, Avon, Ohio, assignor, by mesne assignments, to TRW Inc., Cleveland, Ohio, a corporation of Ohio
Filed Oct. 21, 1968, Ser. No. 769,020
Int. Cl. B23k 9/00
U.S. Cl. 219—98
2 Claims

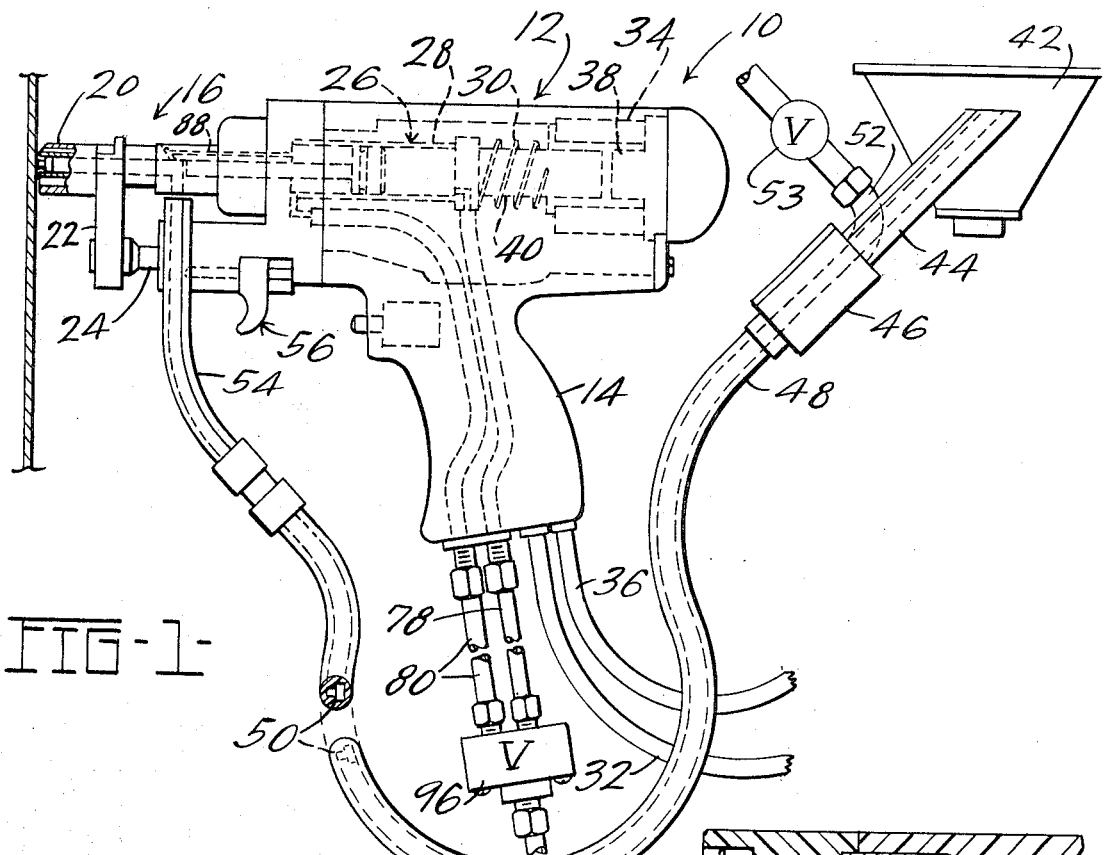
FIG-1-
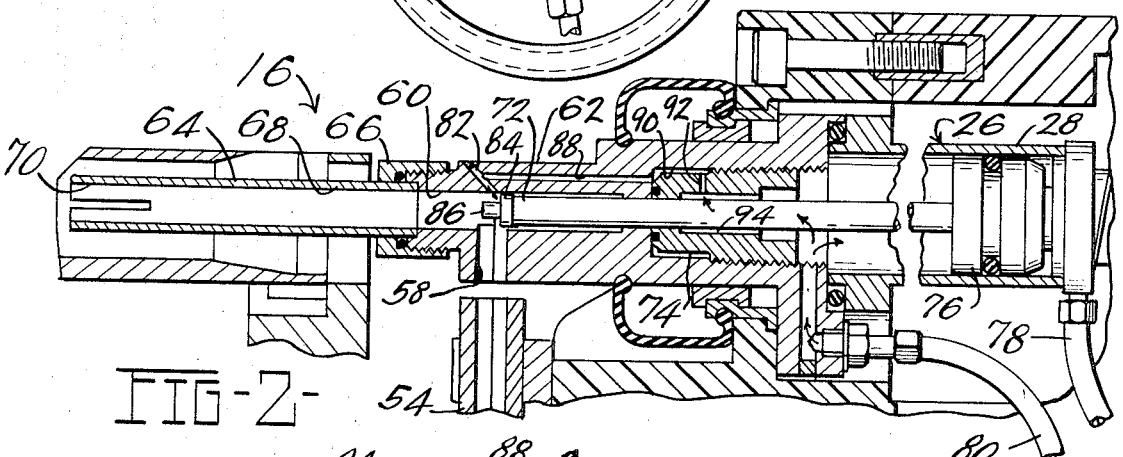
FIG-2-
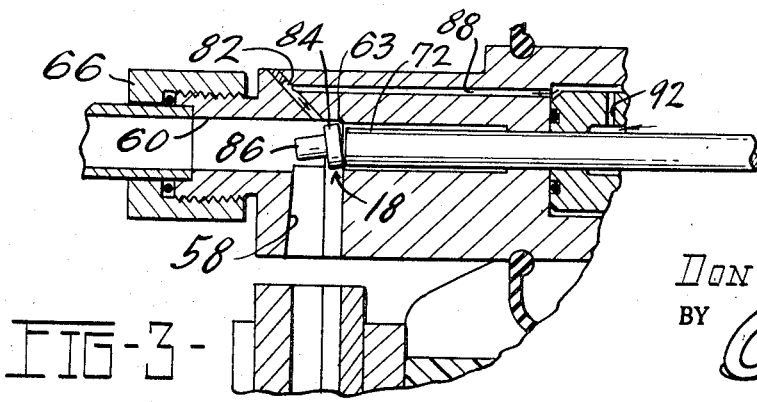
FIG-3-
INVENTOR:
DON E. EHRLICH.
BY
ATT'YS United States Patent Office 3,526,744
Patented Sept. 1, 1970

ABSTRACT OF THE DISCLOSURE

Studs to be welded are blown into a loading chamber behind a chuck of a stud welding tool and then move into the front of the chuck where they are backed up by a plunger. An air nozzle communicates with the chamber and directs air rearwardly toward a stud fed into the chamber to urge the stud away from the chamber inlet in a manner to substantially eliminate stud jamming. The air preferably is supplied from an air cylinder which drives the plunger.

---

This invention relates to stud welding apparatus and particularly to a feeding system for feeding studs to a chuck of a stud welding tool.

Small studs are now used frequently to fasten objects to workpieces. The studs are welded to the workpiece at relatively high rates, sometimes exceeding one per second. To achieve such rates, it is essential that the studs be fed automatically to the welding tool chuck. Accordingly, feeding systems previously have been developed for accomplishing this purpose. These systems generally include a source of a large quantity of the studs which are oriented and fed to a supply track communicating with an escapement. The escapement transfers the studs individually to a flexible feed tube through which the studs are blown into a loading chamber of the welding tool located behind the chuck of the tool. A plunger located rearwardly of the chamber inlet when a stud is received therein then moves forwardly to hold the stud in the end of the chuck when being welded to the workpiece.

When the studs are blown directly into the loading chamber behind the chuck, they tend to bounce considerably. Since the studs are often of a length which differs little from their widest diameter, it is relatively easy for the studs to become jammed in the chamber. This produces a lengthy interruption in the welding operation while the stud is freed. It has been found that by maintaining the plunger in a forward position to block the chamber inlet, when the stud is blown toward the chamber, the stud will hit the plunger, bounce a few times, then rest against the plunger as the air continues to be blown. When the plunger is then retracted, the stud will move into the chamber with a minimum amount of additional bouncing, since the stud moves only a distance approximately equal to the diameter of the plunger during its final travel into the chamber. Minimum bouncing and minimum jamming thereby result.

It has also been found that if a small shoulder is formed in the loading chamber at the rear of the inlet, the stud will apparently tend to assume a square position as it moves into the chamber to minimize being cocked as it moves forwardly to the chuck, with jamming further decreased.

While stud jamming is held to a minimum with the above expedients, an occasional jam will still occur. Even though such is rare, any jamming at all will hamper welding production. In accordance with the invention, a force is applied to the stud when it enters the loading chamber behind the chuck to urge the stud away from the chamber inlet and prevent it from cocking and jamming as it moves through the chamber into the chuck. Specifically, the force is in the form of an air jet which is directed rearwardly in the chamber against a rear portion of the stud to urge the forward end of the stud away from the chamber inlet. This prevents the forward portion of the stud from catching on the edge of the inlet or otherwise cocking and jamming in the chamber. With the use of the invention, jamming of the studs when fed to the chuck of the stud welding tool is reduced substantially to zero.

It is, therefore, a principal object of the invention to substantially eliminate jamming of the studs when automatically fed from a remote source to the chuck of a stud welding tool.

Another object of the invention is to apply a force to a stud entering a loading chamber behind a chuck of a stud welding tool in a manner to urge a portion of the stud away from the chamber inlet.

Other objects and advantages of the invention will be apparent from the following detailed description of a preferred embodiment thereof, reference being made to the accompanying drawings, in which:

FIG. 1 is a somewhat schematic view in elevation of a stud welding tool and an automatic stud feeding system embodying the invention;

FIG. 2 is an enlarged, fragmentary view in longitudinal, vertical cross section of a portion of the welding tool of FIG. 1; and FIG. 3 is a further enlarged, fragmentary view in longitudinal, vertical cross section of a loading portion of the tool of FIG. 2.

Referring particularly to FIG. 1, a stud welding tool 10 is used to end weld small studs to a workpiece in a known manner. The studs are preferably arc welded by the technique disclosed in Nelson Pat. No. 2,191,494 or in Glorioso Pat. No. 3,136,880. The studs can also be welded, however, by the technique disclosed in Graham Pat. No. 2,610,278, by way of example, or by resistance welding.

The stud welding tool 10 includes a main housing 12 of dielectric material having an integral hand grip 14. A chuck assembly indicated at 16 is located at the front of the tool and receives, positions, and holds a stud 18 during the welding operation. The chuck assembly 16 is surrounded by a suitable spark shield 20 attached to a welding foot 22 which is adjustably held by two supporting legs 24.

The chuck assembly 16 is attached to the front of a chuck leg 26 which includes an air cylinder 28 and a solenoid core 30 at the rear thereof. Welding current is supplied to the stud 18 from a main flexible welding cable 32 through the chuck leg 26 and the chuck assembly 16.

The solenoid core 30 extends rearwardly into a lifting and holding coil 34 and the core 30 along with the chuck leg 26 and the chuck assembly 16 is retracted when current is supplied to the coil 34 through a flexible control cable 36. The rearward movement of the core 30, which determines the extent of the lift of the chuck assembly 16 and the stud 18, is limited by an adjustable core piece 38. A return or plunger spring 40 returns the stud to the workpiece when the power to the coil 34 is shut off.

The overall feeding system includes a source 42 of studs shown in the form of a vibratory hopper which carries the studs by a vibratory motion up a spiral track therein, orients them, and feeds them into an inclined supply track 44. The studs are sequently fed to an escapement 46 which transfers the studs individually to a flexible supply tube 48 having an internal passage 50 similar in shape to but slightly larger in size than the transverse sectional shape of the studs 18. The studs 18 are then blown sideways through the flexible tube 48 to the welding tool by air supplied through a line 52 and controlled by a valve 53.

The tube 48 connects with a rigid fitting 54 which is releasably held by a quick-release mounting indicated at 56 at the forward end of the welding tool. The exit end of the fitting 54, which also has a passage similar to the passage 50, communicates with a T-shaped load-chamber inlet 58 (FIGS. 2 and 3) for a loading chamber 60 formed in a chuck adapter or holder 62 which is connected with the forward end of the chuck leg 26 and forms part of the assembly 16. An annular shoulder 63 (FIG. 3) also preferably is located in the chamber 62 to the rear of the inlet 58. A chuck 64 is suitably connected to the adapter 62 as by a threaded connector 66. The chuck 64 has a passage 68 therein communicating at the rearward end with the loading chamber 60 and at a forward end with bifurcated chuck jaws 70.

When the stud 18 is received in the loading chamber 60 through the inlet 58, it moves forwardly into the jaws 70 and is then backed up with the forward end projecting beyond the jaws by a plunger 72. The plunger 72 extends rearwardly through the adapter 62 and through a sealing member 74 to the air cylinder 28 where it is connected with a piston 76. The air cylinder is double-acting with air supplied to the rear or blind end of the piston by a line 78 and with air supplied to the forward or rod end of the cylinder through a line 80.

In accordance with the invention, when the stud 18 enters the chamber 60, a force is applied to the stud tending to urge the forward end away from the forward edge of the inlet 58. For this purpose, a diagonal passage or nozzle 82 is formed in the adapter and is positioned so that a jet or stream of air issuing therefrom has a rearward component. The passage preferably is located at an angle of 20°–60° to the axis of the passage 68 and the chamber 60 and is positioned diametrically opposite the inlet 58. Any angle is satisfactory if the rearward component of the jet is sufficient to control the position of the stud and the downward force of the jet is not strong enough to blow the stud back through the inlet. The air issuing from the nozzle contacts the underside of a rear portion or head 84 of the stud 18, tending to rotate it in a clockwise direction, as shown, to urge a forward portion or stem 86 of the stud upwardly and away from the forward edge of the inlet 58. The air is applied through the nozzle for a period of a fraction of a second which is the period of time the air is applied to the forward end of the cylinder 28 to move the piston and plunger rearwardly and hold the plunger rearwardly while the stud enters the chamber.

While the air can be supplied from various sources for the nozzle or passage 82, it is most expeditious to supply the air from the rod end of the cylinder 28 since this requires a minimum of additional production steps and utilizes air that is already required for the operation of the tool. Accordingly, a rearwardly-extending passage 88 is formed in the adapter 62 with the forward end communicating with the passage 82 and the rearward end terminating in a recess 90 of the adapter into which the sealing member 74 is threaded. The sealing member 74 has a transverse passage 92 through which air can pass from the forward end of the cylinder 28 and an annular passage 94 in the sealing member 74 to the passages 88 and 82.

With this source of air, the diameter of the passage 82 has been found to be satisfactory when in a range of 0.016 to 0.028 inch or larger with the diameter of the passage 88 being from $\frac{1}{32}$ inch to $\frac{1}{16}$ inch and with the air supplied to the cylinder 28 being 80 p.s.i.g. The passages can be larger but no improvement in operation results and more air is consumed.

With this application of force to the stud, a substantial reduction in jamming has been found to result. For example, in one series of tests, 100,000 of the studs 18 were fed to the loading chamber and chuck of a welding tool with air applied against the stud as it enters the chamber, as shown, without any jamming whatsoever occurring. The air passage 82 was then blocked and 2000 additional studs were fed to the tool with jamming occurring on the average of once every 100 studs. The passage was then opened again, and another 100,000 studs fed to the tool without any jamming at all.

While the operation of the system embodying the invention will be apparent from the above description, it will be reviewed briefly. When the plunger 72 is in the forward position near the jaws 70 of the chuck 64, a four-way valve 96 supplies air to the rear of the cylinder 28. The escapement 46 is then operated to transfer a stud to the mouth of the flexible tube 48, at which time the valve 53 is opened to blow the stud through the tube 48, through the fitting 54, and into the inlet 58 against the side of the plunger 72. The stud hits the side of the plunger and bounces a few times, coming to rest against the plunger with air continuing to be blown through the tube 48 from the line 52. The valve 96 is operated to supply air to the forward end of the cylinder 28 to retract the plunger 72 to the position shown in FIG. 2 with the end of the plunger 72 behind the inlet 58. At this time, the stud will move into the loading chamber 60, the final distance which is equal approximately to the diameter of the plunger 72. Since this travel is small, little if any bouncing of the stud 18 will result.

When the air is supplied to the forward end of the cylinder, it also is supplied through the passage 88 and the passage 82 into the loading chamber 60 so that it strikes the rear portion or head 84 of the stud 18 when in the chamber. This tends to move the stem 86 upwardly away from the forward edge of the inlet 58 and prevents the stem 86 from contacting the forward edge of the inlet 58 and cocking or jamming. After the stud has entered the chamber 60, the valve 96 is operated to supply air again to the rear end of the cylinder 28 to move the piston 78 forwardly and cause the plunger 72 to move forwardly and back-up the stud 18 in the position in which the stem 86 projects from the chuck 64, at which time the stud is ready to be welded to the workpiece.

Various modifications of the above described embodiment of the invention will be apparent to those skilled in the art and it is to be understood that such modifications can be made without departing from the scope of the invention since the embodiment described and shown is primarily for purposes of illustration rather than limitation.

I claim:

1. Apparatus for welding a stud having a head and a stem, said apparatus comprising a chuck having a substantially cylindrical passage therein, loading means behind said chuck for loading said chuck, said loading means having a chamber communicating with said passage, said loading means having a stud inlet communicating with said chamber, means forming a feed passage aligned with said stud inlet in one position of said loading means, said feed passage having a contour similar in shape to the longitudinal cross-sectional shape of the stud for directing the stud sideways into said stud inlet with the stem of the stud facing forwardly toward said chuck, means for connecting the chuck to a power source for effecting a weld between the stud and a workpiece, a plunger associated with said loading means for holding a stud in the chuck when a weld occurs, said plunger also having a rearward position behind the stud inlet, a piston connected to said plunger, an air cylinder in which said piston moves, means for supplying air to the forward end of said cylinder for moving said piston in a direction away from said chuck, fluid passage means connecting the forward end of said cylinder with said loading chamber, said fluid passage means being positioned relative to said chamber to direct air with a rearward component against the stud in a manner to urge the stem of the stud away from the stud inlet when received in said chamber.

2. Apparatus according to claim 1 characterized by the air passage being positioned to direct the air at an angle of not more than 60° to the axis of said chuck passage.

References Cited

UNITED STATES PATENTS

| | | |
|---|---|---|
| 3,104,395 | 9/1963 | Grey et al. |
| 3,339,799 | 9/1967 | Spisak. |
| 3,309,495 | 3/1967 | Shoup et al. _____ 219—98 |

JOSEPH V. TRUHE, Primary Examiner

ROBERT O'NEILL, Assistant Examiner

U.S. Cl. X.R.

219—99